United States Patent
Kaplan (10) Patent No.: US 8,315,993 B2
(45) Date of Patent: Nov. 20, 2012

(54) POLICY DECISION STASH FOR STORAGE LIFECYCLE MANAGEMENT

(75) Inventor: Marc Adam Kaplan, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 2037 days.

(21) Appl. No.: 11/129,275

(22) Filed: May 13, 2005

(65) Prior Publication Data

US 2006/0259901 A1 Nov. 16, 2006

(51) Int. Cl.
*G06F 7/00* (2006.01)
*G06F 17/00* (2006.01)

(52) U.S. Cl. ........ 707/694; 707/662; 707/666; 707/689; 726/1

(58) Field of Classification Search .................. 707/2, 4, 707/694, 662, 666, 689; 726/1
See application file for complete search history.

(56) References Cited

U.S. PATENT DOCUMENTS

| | | | | |
|---|---|---|---|---|
| 5,454,099 | A * | 9/1995 | Myers et al. ...................... | 714/6 |
| 5,644,766 | A * | 7/1997 | Coy et al. ........................ | 707/204 |
| 5,659,743 | A * | 8/1997 | Adams et al. ................... | 707/205 |
| 5,768,582 | A * | 6/1998 | Korenshtein ................... | 707/200 |
| 6,125,360 | A * | 9/2000 | Witkowski et al. .............. | 707/2 |
| 6,330,572 | B1 * | 12/2001 | Sitka ............................... | 707/205 |
| 6,505,190 | B1 * | 1/2003 | Harel et al. ...................... | 707/2 |
| 2002/0184223 | A1 * | 12/2002 | Miura .............................. | 707/10 |
| 2004/0193606 | A1 * | 9/2004 | Arai et al. ........................ | 707/9 |
| 2005/0039069 | A1 * | 2/2005 | Prahlad et al. .................. | 714/2 |
| 2005/0086445 | A1 * | 4/2005 | Mizuno et al. ................. | 711/162 |
| 2005/0091461 | A1 * | 4/2005 | Kisley et al. .................. | 711/162 |

OTHER PUBLICATIONS

Y.C. Jimenez et al., "DFSMShsm Primer" ibm.com/redbooks; IBM Corp.: Chapter 1; 2nd Edition; Dec. 2000; pp. 1-14.
A. Verma et al,"An Architecture for Lifecycle Management in Very Large File Systems", Proc. 22nd IEEE/13th NASA Goddard Conf. on Mass Storage Systems and Technologes (MSST 2005); Aug. 2005; 9 pages.
Veritas, "Veritas Storage Foundation Technical Overview", Apr. 2002, pp. 1-28.
D. Freund, "VERITAS' Shared File Foundation", Illuminata, Inc., Nashua, NH, Sep. 20, 2004; pp. 1-9.
J. Menon et al.,"IBM Storage Tank—A heterogeneous scalable SAN file system", IBM Systems Journal, vol. 42. No. 2; 2003; pp. 250-267.
IBM Total Storage SAN File System, "Planning Guide", Version 2, Release 2, IBM Corp; 2004, pp. 1-16.
IBM TIVOLI Storage Manager for Space Management for UNIX and LINUX; "User's Guide"; IBM Corp,; Chapter 1, Version 5.3; 2004; pp. 1-3.
D. Hewgill et al., "IBM TIVOLI Storage Management Version 4.2 Technical Guide", ibm.com/redbooks; IBM Corp.; Chapter 2; Jan. 2002; pp. 37-74.

* cited by examiner

*Primary Examiner* — Shew-Fen Lin
(74) *Attorney, Agent, or Firm* — Tutunjian & Bitetto, P.C.; Louis Percello (57) ABSTRACT

There is provided, in a computer processing system, an apparatus for storage lifecycle management for a plurality of managed objects. The apparatus includes a policy decision manager for creating and managing a policy decision stash. The policy decision stash is associated with predictive policy decisions for the plurality of managed objects and is configured to allow the predictive policy decisions for the plurality of managed objects to be incrementally updated and accessed in the policy decision stash by a policy identifier and an effective timestamp.

25 Claims, 5 Drawing Sheets

| file inode number (pathname) | policy rule identifier | data_time when file is subject to rule | file metrics (optional) |
|---|---|---|---|
| 123848 ( / p / q / x.mpeg)<br>393939 ( / tmp / j / xyz)<br>506598 ( / var / x / temp / q / ck2)<br>293039 ( / home / mine / my.mpeg) | m30<br>m30<br>m90<br>m999 | 2006.12.25@01:00<br>2005.03.29@10:24<br>2005.07.04@21:30<br>2008.01.02@12:59 | 123<br>45678<br>789<br>623 |

POLICY DECISION STASH FOR STORAGE LIFECYCLE MANAGEMENT

BACKGROUND

1. Technical Field

The present invention relates generally to electronic digital file storage management systems and, more particularly, to a policy decision stash and corresponding methods for storage lifecycle management.

2. Description of the Related Art

Use of electronic data storage is increasing at an exponential rate. Much of this data is stored in ordinary Posix-like file systems. Further, much of this data is write-once and is to be retained for long periods of time.

The most commonly used disk storage devices are cheap, but not free and certainly not perfectly reliable nor absolutely durable. Accordingly, there is a need to migrate data to cheaper and/or more reliable media, a need to backup data, and a need to make replicas.

The vast amounts of data and numbers of files maintained makes the manual management of the lifecycle (e.g., creation, backup, archiving, migration, replication, deletion, and so forth) of data files burdensome, error prone, and impractical. Also, government regulations and business requirements demand that data management be conducted according to policy rules that conform to laws, practices, and so forth.

Even in a typical consumer home, there will be tens of thousands of files. For example, consider the operating system(s) and application program files, as well as financial documents and digital media photos (e.g., jpegs), music (e.g., MP3), and movies (e.g., MPEGs). In an enterprise with thousands of employees, customer databases, and so forth, there can be hundreds of millions of files to be managed.

Taken together, the multitude of legal and business requirements and the vast number of file objects to be managed necessitate the automated application of data management policy rules.

Currently, almost every implementation of a data management system for files operates by reading all of the catalog and/or directory entries for all of the files, from first to last, each time a management job is initiated. Each management job, be it backup, migration, deletion, and so forth, typically compares file pathnames and file attributes against a set of policy rules to determine which files should be acted upon.

The overhead of searching and reading the file catalogs and directories (scanning the metadata of a file system) whilst-performing policy rules driven maintenance operations such as backup and data migration expends a significant number of cycles, so much so that it is becoming a significant problem or expense in the operation of these systems, as exemplified by Tivoli Storage Manager(TSM) (data backup) and Tivoli Storage Manager for Space Management(HSM) (data migration, which is also known as hierarchical storage management).

These data management systems also typically lack any predictive, forecasting capability that could help both storage planning and understanding the implications of policy rules.

In one example of a prior art policy driven storage management system, such as IBM's mainframe DFSMS/HSM, as described by Jimenez, et. al., in "DFSMShsm Primer", ISBN-0738421057, IBM Document No. SG24-5272-01, which is incorporated by reference herein, the system periodically re-evaluates policy rules on all objects, executing management actions as required but without caching decisions or predicting any decisions for future actions or for facilitating forecasting and planning.

SUMMARY

These and other drawbacks and disadvantages of the prior art are addressed by the present invention, which is directed to a policy decision stash and corresponding methods for storage lifecycle management.

The present invention may be implemented, e.g., as an apparatus, a method, and a computer program product.

According to an aspect of the present invention, there is provided, in a computer processing system, an apparatus for storage lifecycle management for a plurality of managed objects. The apparatus includes a policy decision manager for creating and managing a policy decision stash. The policy decision stash is associated with predictive policy decisions for the plurality of managed objects and is configured to allow the predictive policy decisions for the plurality of managed objects to be incrementally updated and accessed in the policy decision stash by a policy identifier and an effective timestamp.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

These and other aspects, features and advantages of the present invention will become apparent from the following detailed description of exemplary embodiments, which is to be read in connection with the accompanying drawings.

DETAILED DESCRIPTION OF PREFFERED EMBODIMENTS

The present invention is directed to a policy decision stash and corresponding methods for file storage lifecycle management. The stash and methods of the present invention may also be utilized for file storage forecasting and planning. Accordingly, as used herein, in some embodiments, "storage lifecycle management is intended to encompass file storage forecasting and file storage planning.

Thus, the present invention may advantageously be used for automating the management of computerized data file storage systems. The present invention eliminates the overhead of repeatedly re-evaluating policy rules on file system objects and provides a basis for forecasting and planning the implications of policy rules on a large set of file system objects. Moreover, the present invention may be implemented with respect to other systems that perform policy driven management of large numbers of not-rapidly changing objects.

Various examples in accordance with the principles of the present invention are described herein that show how to efficiently maintain a rule-based tentative file-by-file schedule of data file lifecycle management operations such as file storage migration and file deletion. However, it is to be appreciated that while these several examples are described herein for illustrative purposes, the present invention is not limited to the preceding examples and corresponding applications and, given the teachings of the present invention provided herein, one of ordinary skill in the related art will contemplate these and various other applications and file management operations to which the present invention may be applied, while maintaining the scope of the present invention.

It should be understood that the elements shown in the Figures may be implemented in various forms of hardware, software or combinations thereof. Preferably, these elements are implemented in software on one or more appropriately programmed general-purpose digital computers having a processor and memory and input/output interfaces.

It is to be appreciated that as used herein, the phrase "at least one", when used to refer to more than one object (e.g., A and B), refers to one of A or one of B or one of A and one of B.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
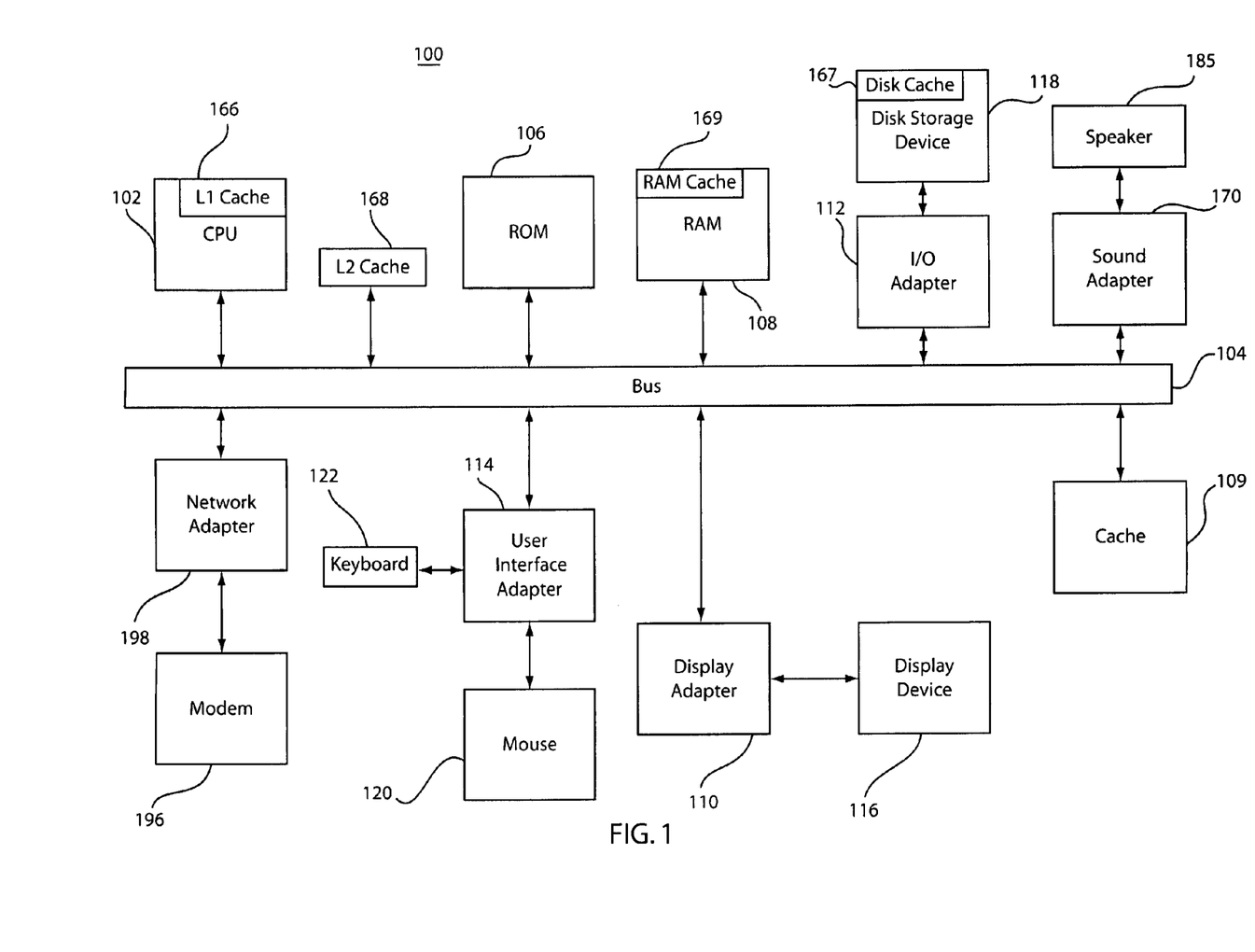
FIG. 1 is a block diagram illustrating an exemplary computer processing system 100 to which the present invention may be applied, according to an illustrative embodiment of the present invention.

Turning to FIG. 1, an exemplary computer processing system to which the present invention may be applied is indicated generally by the reference numeral 100. The computer processing system 100 includes at least one processor (CPU) 102 connected in signal communication with other components via a system bus 104. A read only memory (ROM) 106, a random access memory (RAM) 108, a display adapter 110, an I/O adapter 112, a user interface adapter 114, a sound adapter 170, and a network adapter 198, are each connected in signal communication with the system bus 104.

The CPU 102 may include one or more "on-board" caches (e.g., L1 caches) (hereinafter "L1 cache") 166. Moreover, the CPU may be in signal communication with one or more "external caches" (e.g., disk caches and RAM caches) (hereinafter "disk cache" 167 and "RAM cache 168"). Further, the CPU 102 may also be in signal communication with one or more other "external caches" (e.g., on a chip other than the CPU and RAM chips such as, e.g., L2 caches) (hereinafter "L2 cache") 168. Of course, other cache configurations may also be employed in accordance with the present invention while maintaining the scope of the present invention.

A display device 116 is connected in signal communication with system bus 104 by display adapter 110.

A disk storage device (e.g., a magnetic or optical disk storage device) 118 is connected in signal communication with system bus 104 by I/O adapter 112.

A mouse 120 and keyboard 122 are connected in signal communication with system bus 104 by user interface adapter 114. The mouse 120 and keyboard 122 are used to input and output information to and from computer processing system 100.

At least one speaker (herein after "speaker") 185 is connected in signal communication with system bus 104 by sound adapter 170.

A (digital and/or analog) modem 196 is connected in signal communication with system bus 104 by network adapter 198.

It is to be appreciated that computer processing system 100 may be represented, in whole or in part, as a data storage management (DSM) system such as that described herein below, wherein a novel policy decision stash is included therein. Moreover, it is to be appreciated that the policy decision stash in accordance with the principles of the present invention may be implemented with respect to one or more of any type of cache or memory including, but not limited to caches, caches as shown and described with respect to FIG. 1 (e.g., L1 cache 166, L2 cache 168, disk cache 167 and disk storage device 118, RAM 108 and RAM cache 169, and so forth).

Advantageously, a policy decision stash and methods for maintaining the stash and using the stash for the purposes of file storage data lifecycle management, forecasting, and planning is described herein.

The policy decision stash holds a set of policy decision records. Each decision record includes fields describing a tentative policy decision, with the fields relating to the following: a unique file identifier; a policy identifier; and an effective timestamp. A preferred embodiment may also have one or more of the following additional fields in each policy decision record: a directory identifier; a file name within the directory; a decision priority metric; a file weighting metric; and possibly other metrics. It is to be appreciated that while a decision record is described to include the preceding identifiers, timestamps, and metrics, given the teachings of the present invention provided herein, other identifiers, timestamps, metrics, and parameters may also be employed in accordance with the principles of the present invention while maintaining the scope of the present invention.

The effective timestamp for a particular policy identifier on a particular file identifier is the earliest date and time at which some policy rule dictates a management action should be initiated against the file, presuming that neither the file nor the policy rules change between now and the effective timestamp. For example, policy rules may dictate that any file found under the "/tmp" directory should be deleted 30 days after it was created. In this example, the effective timestamp can be computed for the policy identifier deletion for any file cataloged under the "/tmp" directory as (creation_time+30 days).

There may be multiple policy decision records for a file because, e.g., multiple policy rules might apply to the file and/or there might be multiple directory entries (pathnames) for the file.

In an embodiment, at least the following two indices are maintained over the set of policy decision records stored in the policy decision stash: (1) file identifier, so that all records pertaining to a particular file can be quickly located, updated and/or removed; and (2) policy identifier and effective timestamp, so that all decision records pertaining to a particular policy that are (or have been predicted to be) effective for a particular range of dates and times can be quickly located.

It is to be appreciated that, in some embodiments, the policy decision stash can be viewed as a database table. Accordingly, any known methods, including those described herein, may be used to store, index and maintain the policy decision stash as a database table within a computer system. However, given the teachings of the present invention provided herein, it is to be appreciated that the policy decision stash may be implemented using data structures other than a database while maintaining the scope of the present invention.

The policy decision stash is initially populated by traversing the complete namespace of a file system, including all directory entries and evaluating all storage management policy rules on each file entry found within each directory. For each policy that either applies immediately to a file or may apply in the future, an effective timestamp is computed and a decision record is created and inserted into the policy decision stash.

The policy decision stash can be updated periodically or "on demand", by re-evaluating all the policy rules on all directory entries and files (or a pre-specified subset(s) thereof) that have changed since the previous policy stash update (or initial population.) The changed directory entries and files can be efficiently determined by reading a changed files list which may be maintained by the file system. Implementations of the changed files list are described in, e.g., the following U.S. patent application Ser. Mo. 11/128,781, entitled "Changed Files List with Time Buckets for Efficient Storage Management", filed concurrently herewith, assigned to the assignee herein, the disclosure of which is incorporated by reference herein in its entirety.

The policy decision stash can be used for file storage data lifecycle management by updating the policy decision stash periodically or "on demand" and then fetching all the records for particular policy IDs whose effective timestamps are current or in the past. For each such record, the action(s) called for by the policy ID(s) is executed. For example, a policy may exist that is identified as "delete_tmp_files_older_than_30_days", which is to be enforced every day at 2:00 AM. To do so, each day at 2:00 AM, update the policy decision stash, find all the records with policy id="delete_tmp_files_older_than_30_days" whose effective timestamp field represents a time and date equal to or earlier than 2:00 AM today. The set of files represented by these records and directory entries referring to such files are deleted.

It is to be noted that if the file system is maintaining a changed file list as described in the above referenced U.S. patent application, entitled "Changed Files List with Time Buckets for Efficient Storage Management", a side effect of file deletion will be updating the changed files list to record the files as deleted, so that the next time the policy stash is updated, the policy decision records for the deleted files will be expunged from the policy decision stash.

The policy decision stash can be used for forecasting and planning by updating the stash periodically or "on demand" and then fetching all the records for particular policy IDs whose effective timestamps are within some future date and time range. Analysis and accounting are performed, and statistics accumulated about such records and the files to which they refer. For example, a policy may exist that is identified as "archive_to_tape_personnel_files_older_than_90_days" where, as the policy ID suggests, requires some set of files to be copied to tape media and transported to a secure location 90 days after they are first written to disk based storage. It would be useful to be able to forecast how many such files and how many bytes of data need to be written in future weeks so that storage system engineers and administrators can plan the acquisition, setup, installation, and transportation of necessary equipment and storage media (e.g., tape drives, tape cartridges, trucks, and so forth). Forecasting and planning can begin by fetching the records with policy id="archive_to_tape_personnel_files_old_than_90_days", grouping the records by months, weeks, and dates, counting the number of unique files to be archived each day and each week, summing the sizes of the files and so forth.

The policy decision records may include additional fields such as a decision priority metric and/or a file weighting metric(s). These fields can be used for several purposes. For example: to select just the highest priority objects whose total weight satisfies a management objective, from among all of the objects that satisfy a given policy ID and timestamp selection criteria. More specifically, priority might be by file age, weight might be by number of disk blocks allocated to the file, and the management objective might be to delete the oldest of the temporary files that are at least 30 days old, so that a total of at least one million blocks can be made available for re-use. This kind of management objective can be achieved algorithmically by first selecting a subset S of the policy decision records by policy ID and timestamp range, and then searching for a maximal priority value, p, such that the sum of the weights of all policy decision records in S with priority greater than or equal to p is greater than or equal to the objective total weight.

A description will now be given regarding a preferred embodiment of the present invention.

Figure 2:
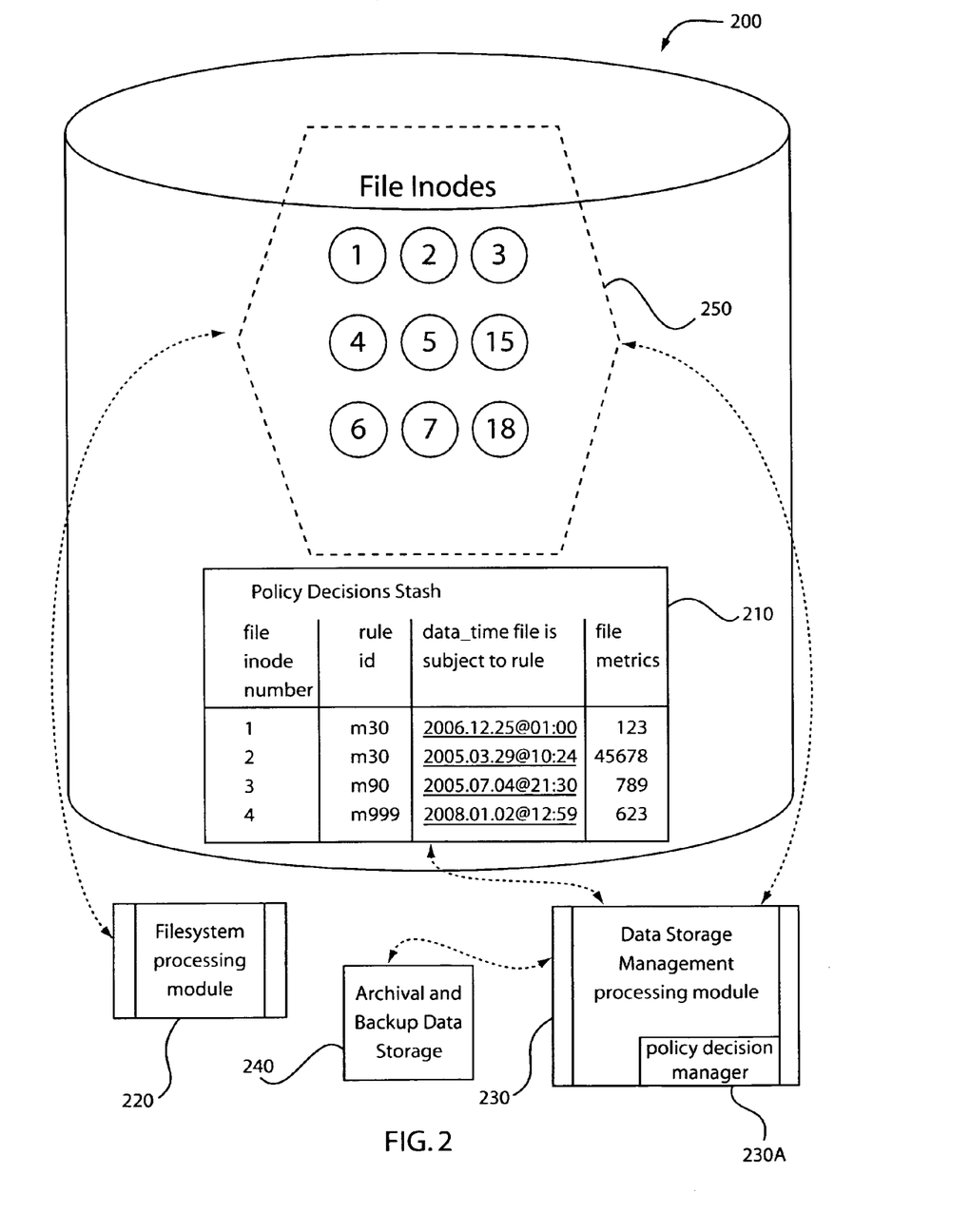
FIG. 2 is a diagram illustrating an exemplary data storage management system with a policy decision stash in accordance with the principles of the present invention.

Turning to FIG. 2, an exemplary data storage management (DSM) system is indicated generally by the reference numeral 200. The data storage management system 200 includes an exemplary policy decision stash 210 in accordance with the principles of the present invention. Moreover, the data storage management system 200 includes a file system processing module 220, a data storage management processing module 230, an archival and backup data storage device 240. File inodes 250 are used by the file system processing module 220, the data storage management processing module 230, and the policy decision stash 210.

The policy decision stash 210 is, in some embodiments, a table maintained by a DSM system, such as DSM system 200. Each row in the policy decision stash 210 is a tuple with column values as follows: file inode number, policy rule identifier (rule ID), effective date_time value file is subject to rule (as identified by the policy rule identifier), and (optionally) one or more file metrics.

A policy decision manager 230A, disposed in the data storage management processing module 230, creates and manages the policy decision stash 210. While the policy decision manager 230A is shown and described with respect to data storage management processing module 230, it is to be appreciated that the policy decision manager 230A may be implemented as a stand alone device, or may be implemented in one or more other elements of a data storage management (DSM) system or a computer processing system, while maintaining the scope of the present invention.

Figure 3:
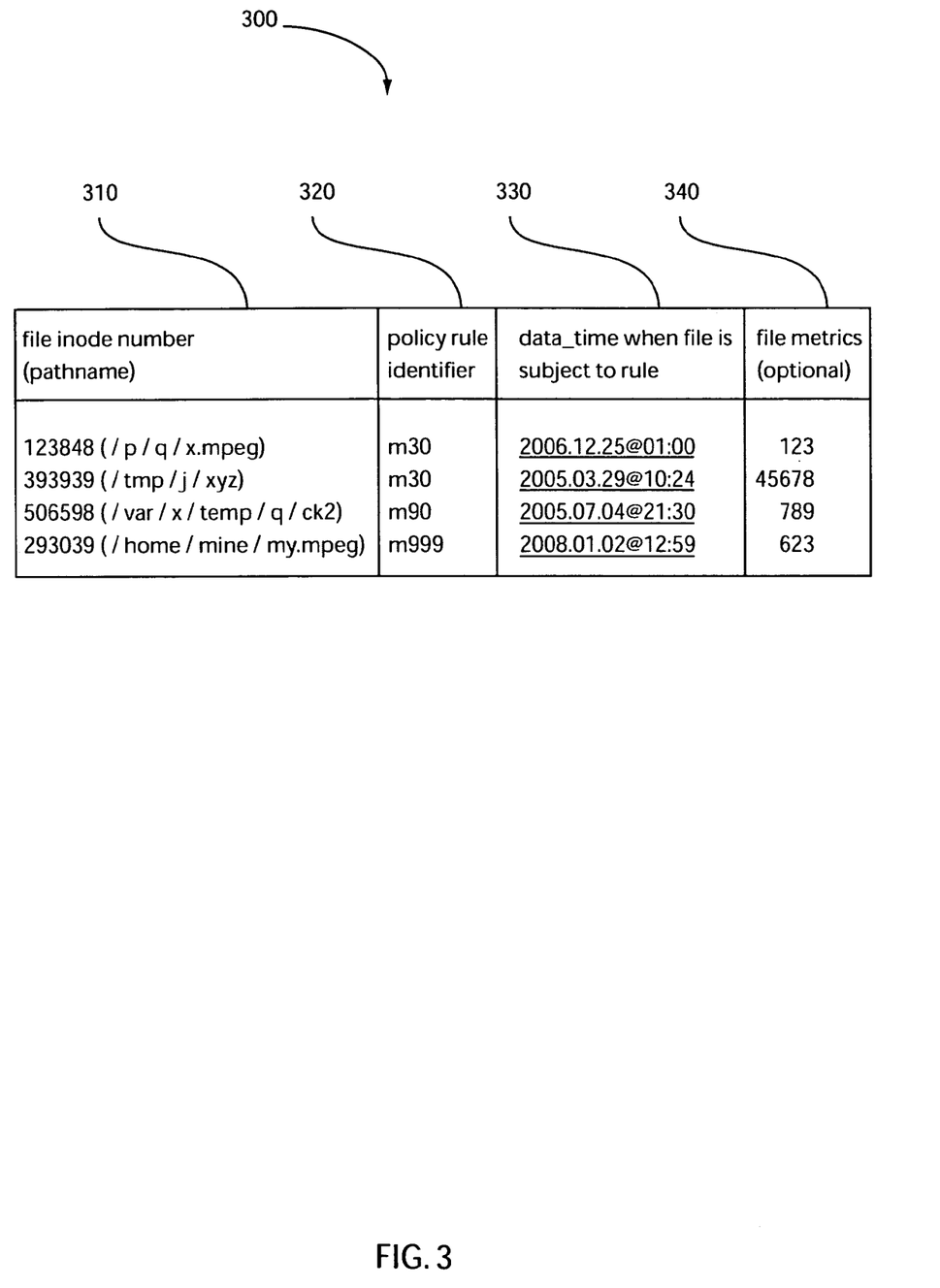
FIG. 3 is a diagram illustrating an exemplary policy decision stash in accordance with the principles of the present invention.

Turning to FIG. 3, an exemplary data configuration of a policy decision stash is indicated generally by the reference numeral 300. The policy decision stash 300 includes a first column 310 for specifying file inode numbers (and pathnames), a second column 320 for specifying policy rule identifiers, a third column 330 for specifying a date and time when the file (specified in the first column 310) is subject to the rule (specified in the second column 320), and an optional fourth column 340 for optionally specifying file metrics.

For illustrative purposes, the file pathnames are shown in the exemplary policy decision stash 300 of FIG. 3. However, the file pathnames may also be computed and stored in a separate inode_to_pathnames table.

The meaning of a row with values (f, r, t, m) is that file f will be subject to policy rule r at no time sooner than time t.

The optional metrics field m can be used to conveniently store some attribute or attributes of file f that might be useful when selecting files for a management operation. For example, storing the size of each file in the policy decision stash 300 would allow the DSM system to find the largest files subject to a particular policy rule R at time T just by reading the policy decision stash 300, without having to retrieve the attributes of all files subject to rule R at time T, which would potentially require reading many inodes.

The DSM system 200 computes these policy decision stash entries by considering the attributes of each file, all of the DSM policy rules that might apply to the files and presuming that time will march on, but that none of the attributes of the files will change. The preceding is further described herein below.

A typical DSM system runs as a periodically scheduled computing job within a computer system. Moreover, a DSM job can be started in response to some event or operator command.

The first phase of a DSM job is to consider all files that are new or changed since the last DSM job run and update the policy decision stash accordingly. Also, if the policy rules change, that may necessitate reconsidering all files within the file system.

Two indices are maintained over the policy decision stash. The first index is key file inode number (f) so that all entries pertaining to a particular inode number can be located. The second index is key: rule identifier and date_time (r,t) so that all entries pertaining to a particular rule number can be located and that subset can be accessed in date_time order.

A description will now be given regarding DSM policy rules.

For expository purposes, a data storage management (DSM) system is described that is governed by a list of policy rules with syntax and meanings as described below. Given the teachings of the present invention provided herein, one of ordinary skill in this and related arts will readily contemplate how the present invention is applicable to any similar system.

In our exemplary DSM system 200, each data file is stored in one of several available storage pools. A storage pool is typically a collection of disk data drives or is a magnetic data tape library. Migration policy rules specify when and which files should be moved from one storage pool to another storage pool(s). Deletion policy rules specify when and which files should be deleted from the system.

The following exemplary syntax is provided for exemplary DSM policy rules for use in accordance with the principles of the present invention:

---

Exclude Rule Syntax
RULE rule-id [ WHEN time-boolean-expr ] EXCLUDE
    WHERE where-file-clause
Migration Rule Syntax
RULE rule-id [ WHEN time-boolean-expr ] MIGRATE
    FROM POOL storage-pool-name-1
        [ THRESHOLD (high, low) ] TO POOL storage-pool-
        name-2 WHERE where-file-clause
Deletion Rule Syntax
RULE rule-id [ WHEN time-boolean-expr ] DELETE
    FROM POOL storage-pool-name-1
        [ THRESHOLD (high, low) ] WHERE where-file-
        clause

---

When Clause with Time-Boolean-Expression

A time-boolean-expression is an SQL expression that yields a boolean value and only depends on time functions and constants, e.g., DAYOFWEEK(CURRENT_DATE)=1

A description will now be given regarding the meaning of DSM policy rules.

A rule that contains the optional WHEN clause only applies during the times when that rule's time-boolean-expression evaluates to True.

A rule that contains the FROM POOL clause only applies to files stored in the named storage-pool-name-1

A rule that contains the optional THRESHOLD clause only applies when the named storage-pool-name-1 is occupied at fraction of its capacity that is between the specified high and low (percentage) values.

A rule applies only to files that satisfy its WHERE clause (see herein below.)

Each file is subject to a list of policy rules, considered in order. At any given time only the firstmost applicable rule applies.

When an EXCLUDE rule is the first applicable rule, then no action is taken on a file.

When a MIGRATE rule is the first applicable rule, then the file is subject to be migrated from storage-pool-name-1 to storage-pool-name-2.

When a DELETE rule is the first applicable rule, then the file is subject to be deleted from storage-pool-name-1.

A description will now be given regarding a "where-file-clause".

A where-file-clause is an SQL expression that yields a Boolean value and depends on the attributes of a file. An exemplary where-file-clause is as follows:

```
    .------------------------------AND / OR--------------------------.
  V                                                                  |
>>--------+------------------+---+- >   --+--integer--DAYS----+-----+------>< 
  |  |--+---ACCESS_AGE---+---|    | - >= --|                      |
  |  |   '---AGE-----------'      | - <  --|                      |
  |  |--MODIFICATION_AGE--|       | - <= --|                      |
  |  '--CREATION_AGE---------'                                    |
  |                                                               |
  |                                                               |
  | --+-------------+---NAME--+------------+---LIKE ( string-expr )-- |
  |   |--UPPER---|          '--NOT--'                             |
  |   '--LOWER---'                                                |
  |                                                               |
  |                                                               |
  '-------SIZE--+- >   --+---integer---+---KB--+----------------------'
               | - >= --|              | --MB--|
               | - <  --|              '--GB-- '
               | - <= --|
               '-  =  --'
```

An exemplary policy rules list is as follows:

Rule mpg30 WHEN (DayOfWeek( )=1 and HourOfDay( )=2 MIGRATE FROM POOL 'scsi' TO POOL 'sata' WHERE NAME LIKE "%.mpg" and ACCESS_AGE>30 DAYS Rule xbosses EXCLUDE WHERE NAME LIKE "%.xyz"

Rule mpg90 WHEN (DayOfWeek( )=7 and HourOfDay( )=3 MIGRATE FROM POOL 'sata' TO POOL 'tape' WHERE NAME LIKE "%.mpg" and MODIFICATION_AGE>90 DAYS Rule mpg999 WHEN (MonthOfYear( )=12 and DayOfWeek( )=1 and HourOfDay( )=1) DELETE FROM POOL 'tape' WHERE NAME LIKE "%.mpg" and CREATION_AGE>999 DAYS A description will now be given regarding using the policy decision stash to drive policy rule directed file migrations and deletions.

Figure 4:
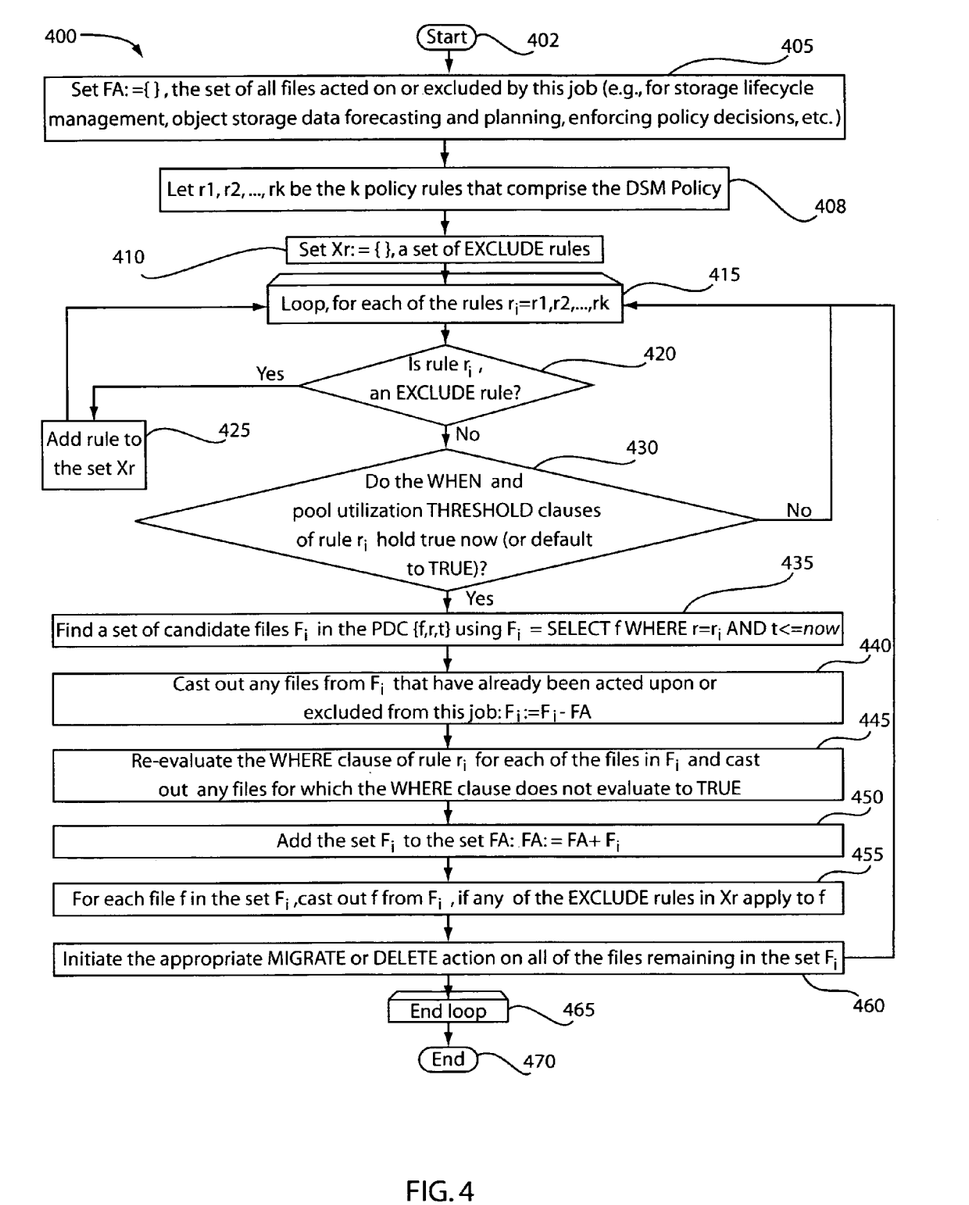
FIG. 4 is a diagram illustrating an exemplary process for using a policy decision stash to drive policy rule directed data management actions in accordance with the principles of the present invention.

Once the policy decision stash is brought up to date, the DSM job uses the policy decision stash to find all "candidate" files for migrate and delete actions using, e.g., the exemplary process of FIG. 4.

Turning to FIG. 4, an exemplary process for using a policy decision stash to drive policy rule directed file migrations and deletions is indicated generally by the reference numeral 400. It is to be noted that the process 400 uses the set FA and the various selection and "casting out" steps so as to be semantically equivalent to the more simply described model of DSM Rules evaluation described herein with respect to the DSM policy rules.

The process 400 includes a start block 402 that passes control to a function block 405. The function block 405 sets FA:={ }, where FA is initialized as an empty set that is to evolve into the set of all files acted on or excluded by this job (e.g., for storage lifecycle management, object storage data forecasting and planning, enforcing policy decisions, etc.), and passes control to a function block 408. The function block 408 lets r1, r2, . . . , rk be the k policy rules that form the DSM Policy, and passes control to a function block 410. The function block 410 sets Xr:={ }, where Xr is initialized as an empty set that is to evolve into a set of EXCLUDE rules, and passes control to a loop limit block 415. The loop limit block 415 performs the following steps for each of the rules r[i]= r1, r2, . . . , rk, and passes control to a decision block 420. The decision block 420 determines whether or not rule $r_i$ is an EXCLUDE rule. If so (rule $r_i$ is an EXCLUDE rule), then control is passed to a function block 425. Otherwise (rule $r_i$ is not an EXCLUDE rule), control is passes to a decision block 430.

The function block 425 adds the rule $r_i$ to the set Xr, and returns control to loop limit block 415 so as to consider the next rule.

The decision block 430 determines whether or not the WHEN and pool utilization THRESHOLD clauses of rule $r_i$ hold true now (or default to TRUE). If so, then control is passed to a function block 435. Otherwise, control is returned to function block 415.

The function block 435 finds a set of candidate files $F_i$ in the policy decision stash {f,r,t} using $F_i$=SELECT f WHERE r=$r_i$ AND t<=now., and passes control to a function block 440. The function block 440 casts out any files from $F_i$ that we've already acted upon or excluded from this job: $F_i$:=$F_i$−FA, and passes control to a function block 445. The function block 445 re-evaluates the WHERE clause of rule $r_i$ for each of the files in $F_i$ and casts out any files for which the WHERE clause does not evaluate to TRUE, since the policy decision stash includes only an "estimated" time at which the rule might hold, and passes control to a function block 450. The function block 450 adds the set $F_i$ to the set FA: FA:=FA+$F_i$, and passes control to a function block 455. The function block 455, for each file f in the set $F_i$, casts out f from $F_i$ if any of the EXCLUDE rules in Xr apply to f, and passes control to a function block 460. The function block 460 initiates the appropriate MIGRATE or DELETE action on all of the files remaining in the set $F_i$, and returns control to loop limit block 415 for each rule until the last rule (rule rk) has been processed, and then passes control to a loop limit block 465. The loop limit block 465 passes control to an end block 470.

A description will now be given regarding computing the policy decision stash entries for a file, considering the future of the file.

As noted above, a DSM job computes the policy decision stash entries for files by considering each the attributes of each file, all of the DSM policy rules and presuming that time will march on, but that none of the attributes of the files will change. A further description of how a DSM job accomplishes this will now be provided.

A description of time-to-truth functions will now be given.

For any given file f, policy rule r, and time t, we can bind the various SQL attribute variables to the actual attributes of file f and the "CURRENT_TIME" to t, and evaluate the WHEN and WHERE clauses of rule r resulting in a truth value of TRUE or FALSE. We can consider this procedure of evaluating any policy rule as a function V, V:{(f,r,t)}→{True, False}. We can also consider the values of V(f,r,t) for a particular file f, rule r, and any times t (e.g., past, present and future). In other words, if we fix the attributes of a file f, and consider a policy rule r, but allow time t to be a variable, we have a function from time t to truth, which is referred to as V[f,r](t).

For DSM purposes, consideration of past times is usually not needed, and it may be difficult or unwieldy to compute or represent the value of V[f,r](t) for all future time values. Thus, we introduce the notion of approximating V[f,r](t) with a function W[f,r](t) with an extended range of {True, False, Maybe}. We use a 3-valued logic where, like the Null value of standard SQL, the Maybe logic value means "maybe True, maybe False, we don't know or haven't computed it". In this logic: NOT Maybe==Maybe; Maybe AND True==Maybe; Maybe AND False==False; Maybe OR True==True; Maybe OR False==Maybe; and so on. W[f,r](t) is an approximation of V[f,r](t) in the sense that whenever W[f,r](t)==True then V[f,r](t)==True, and whenever W[f,r](t)==False then V[f,r](t)==False.

In practice, we can represent these kinds of time/truth functions "concretely" as short lists of date_time intervals, numbers, and truth values. For example, a valid approximation of DayOfWeek(t)==6 is
(-inf,2005.02.25@00:00)=>Maybe,
[2005.02.25@00:00,2005.02.26@00:00)=>True,
[2005.02.26@00:00,2005.03.04@00:00)=>False,
[2005.03.04@00:00,2005.03.05@00:00)=>True,
[2005.03.05@00:00,+inf)=>Maybe.

In this example, for expediency, we use the Maybe value for the past and for all times beyond 2 weeks from the present; −inf is the infinite past; +inf is the infinite future.

Much of the time, truth functions can be represented exactly (no Maybes!) with just a few numbers. For example, for a particular file, the time-to-truth function of the expression ACCESS_AGE>=30 DAYS AND ACCESS AGE<90 DAYS might be as follows:
(-inf,2005.03.29@10:24)=>FALSE,
[2005.03.29@10:24,2005.05.28@10:24)=>TRUE,
[2005.05.28@10:24,+inf)=>FALSE Of course, other representations of time-to-truth functions are possible and may be used in our DSM and policy decision stash processes.

Further, we can compose time-to-truth functions X and Y with any of the usual logical operators: AND, OR, NOT in the usual way as follows:
(X OPERATOR Y) (t):=:X(t) OPERATOR Y(t)

Thus, the WHEN and WHERE clauses of any particular DSM policy rule applied to the file attribute values of any particular file define a time-to-truth function that can be approximated by a fairly simple and concise concrete representation.

We define M(X, now) as the next possible moment of truth of a time-to-truth function X with respect to time now: M(X, now)=the least value of t such that t>=now and (X(t)==True or X(t)==Maybe). For example, if X is the time-to-truth function given in the DayOfWeek(t)==6 example above, then M(X, 2005.02.28@12:01)==2005.03.04@00:00.

With these preliminaries, we can now present an algorithm for computing (updating) the policy decision stash entries for a file f.

Figure 5:
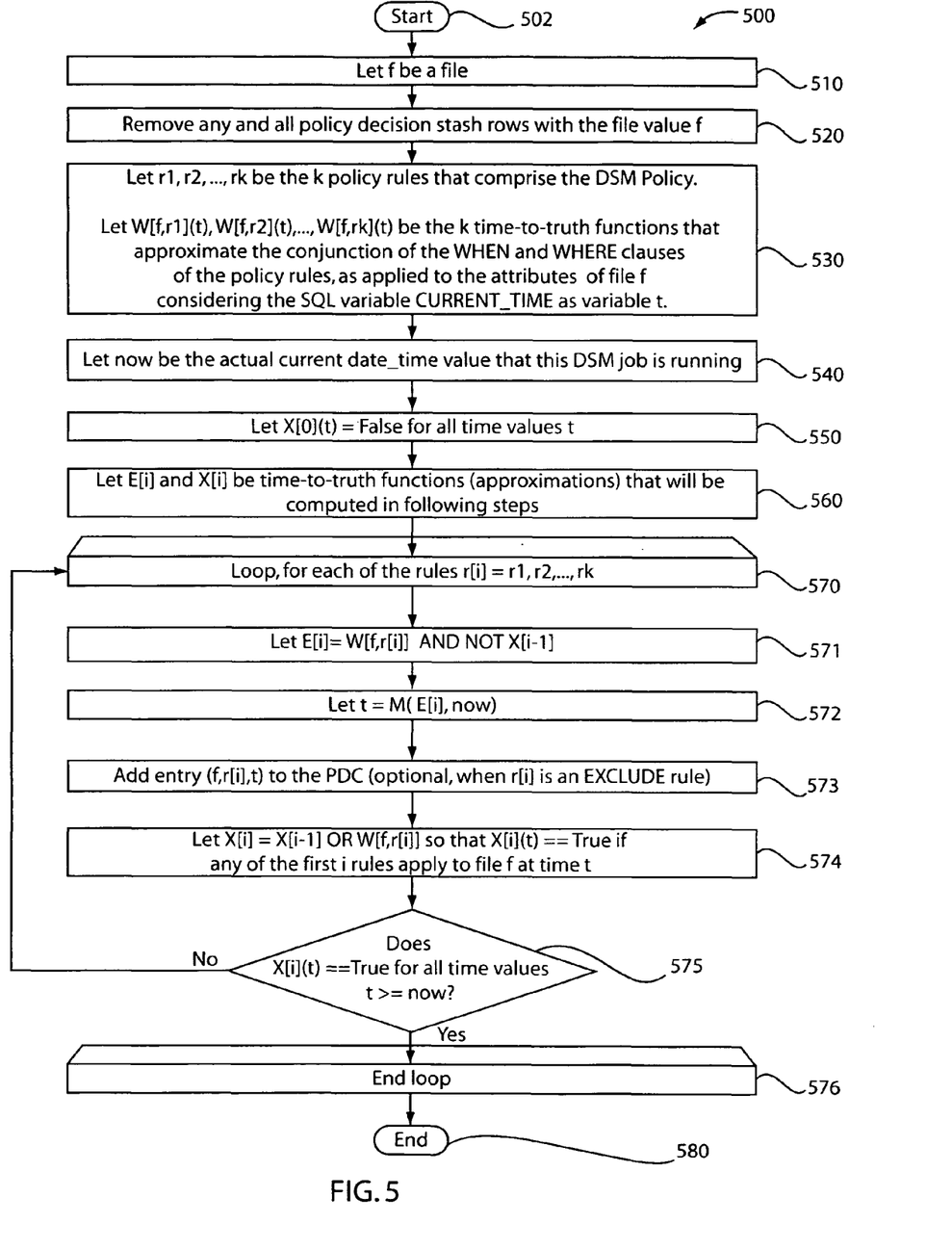
FIG. 5 is a diagram illustrating an exemplary process for computing policy decision stash entries for a file in accordance with the principles of the present invention.

Turning to FIG. 5, an exemplary process for updating entries in policy decision stash is indicated generally by the reference numeral 500.

The process 500 includes a start block 502 that passes control to a function block 510. The function block 510 lets f be a file, and passes control to a function block 520. The function block 520 removes any and all policy decision stash rows with the file value f, and passes control to a function block 530. The function block 530 lets r1, r2, . . . , rk be the k policy rules that form the DSM Policy, lets W[f,r1](t), W[f,r2](t), . . . W[f,rk](t) be the k time-to-truth functions that approximate the conjunction of the WHEN and WHERE clauses of the policy rules, as applied to the attributes of file f considering the SQL variable CURRENT_TIME as variable t, and passes control to a function block 540. With respect to function block 530, it is to be noted that a pool utilization THRESHOLD clause is considered as an "AND Maybe" clause added to the conjunction of the WHEN and WHERE clauses, since we can't know. The function block 540 lets now be the actual current date_time value that this DSM job is running, and passes control to a function block 550. The function block 550 lets X[0](t)=False for all time values t, and passes control to a function block 560. The function block 560 lets E[i] and X[i] be time-to-truth functions (approximations) that will be computed hereinafter in the process 500, and passes control to a loop limit block 570. The loop limit block 570, performs the following steps for each of the rules r[i]=r1, r2, . . . , rk, and passes control to a function block 571. The function block 571 lets E[i]=W[f,r[i]] AND NOT X[i-1] (an approximation may be used), and passes control to a function block 572. With respect to function block 571, E[i] is the time-to-truth function given by the i'th rule but takes into account the possibility that some higher priority rule may also apply to the same file at the same future time, thereby "knocking" out the i'th rule. The function block 572 lets t=M(E[i], now), where t is the next possible moment of time that rule i might apply to file f, and passes control to a function block 573. The function block 573 adds entry (f,r[i],t) to the policy decision stash, and passes control to a function block 574. With respect to function block 573, it is to be appreciated that the function performed thereby is optional when r[i] is an EXCLUDE rule, as we do not need to store EXCLUDE entries in the policy decision stash. The function block 574 lets X[i]=X[i-1] OR W[f,r[i]], so that X[i](t)==True if any of the first i rules apply to file f at time t, and passes control to a decision block 575. The decision block 575 determines whether or not X[i](t)==True for all time values t>=now. If so, then control is passes to a loop limit block 576 that terminates the loop, and passes control to an end block 580. Otherwise, control is returned to loop limit block 570.

With respect to function block 575, it is to be noted that the cases should be considered carefully. For example, for some time t we might have:
W[f,r[i]](t)==True and also X[i-1](t)==Maybe.
Then E[i](t)==Maybe, because some higher priority rule might apply.
But X[i](t)==True, because we are sure that either a higher priority rule applies or rule i applies.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. In a computer processing system, an apparatus for storage lifecycle management for a plurality of managed objects, comprising:
   a policy decision manager for creating and managing a policy decision stash, the policy decision stash being associated with predictive policy decisions for the plurality of managed objects and configured to allow the predictive policy decisions for the plurality of managed objects to be incrementally updated and accessed in the policy decision stash by a policy identifier and an effective timestamp for the policy identifier;
   wherein said policy decision manager configures the policy decision stash to be associated with a set of policy decision records, wherein each of the policy decision records in the set are respectively associated with the policy identifier, the effective timestamp, and a unique object identifier corresponding thereto; and wherein each of the decision records is further associated with a decision priority metric and a file weighting metric.

2. The apparatus of claim 1, wherein the effective timestamp corresponds to an earliest date and an earliest time at which a given one of the predictive policy decisions dictates a management action is to be initiated against a corresponding one or more of the plurality of managed objects.

3. The apparatus of claim 1, wherein said policy decision manager further configures the policy decision stash to allow the predictive policy decisions for the plurality of managed objects to be incrementally updated and accessed in the policy decision stash by a unique object identifier.

4. The apparatus of claim 1, wherein said policy decision manager configures the policy decision stash to allow the predictive policy decisions for the plurality of managed objects to be incrementally updated and accessed in the policy decision stash by a unique object identifier.

5. The apparatus of claim 1, wherein said policy decision manager configures the policy decision stash to provide file storage data lifecycle management by fetching the policy decision records for the policy identifiers whose effective timestamps are current or in the past, and implementing actions associated with the policy identifiers of the fetched policy decision records.

6. The apparatus of claim 1, wherein said policy decision manager further configures the policy decision stash to store metrics for at least some of the plurality of managed objects in corresponding policy decision records, and to provide object storage data forecasting and planning by fetching the policy decision records for the policy identifiers whose effective timestamps are within a specified future date and time range, and collecting and analyzing the metrics for the fetched policy decision records and any of the plurality of managed objects corresponding thereto.

7. The apparatus of claim 1, wherein said policy decision manager further configures the policy decision stash to facilitate the enforcement of the predictive policy decisions by fetching the policy decision records for the policy identifiers whose effective timestamps are current or in the past, and implementing actions associated with the policy identifiers of the fetched policy decision records.

8. The apparatus of claim 1, wherein said policy decision manager configures the policy decision stash to facilitate the selection of one or more of the policy decision records to satisfy a specified management goal based on both the policy identifiers and object metrics corresponding to the plurality of managed objects.

9. The apparatus of claim 1, wherein the plurality of managed objects include at least one given file, and the decision priority metric is based on an age of the at least one given file, and the file weighting metric is based on a number of disk blocks allocated to the at least one given file.

10. In a computer processing system, a method for storage lifecycle management for a plurality of managed objects, comprising the steps of:
  storing, in a policy decision stash, predictive policy decisions for the plurality of managed objects;
  configuring the policy decision stash such that the predictive policy decisions for the plurality of managed objects are capable of both being incrementally updated and accessed in the policy decision stash by a policy identifier and an effective timestamp for the policy identifier;
  configuring the policy decision stash to store a set of policy decision records, wherein each of the policy decision records in the set are stored so as to be respectively associated with the policy identifier, the effective timestamp, and a unique object identifier corresponding thereto; and
  wherein each of the decision records stored in the policy decision stash is further associated with a decision priority metric and a file weighting metric.

11. The method of claim 10, wherein the effective timestamp corresponds to an earliest date and an earliest time at which a given one of the predictive policy decisions dictates a management action is to be initiated against a corresponding one or more of the plurality of managed objects.

12. The method of claim 10, wherein said configuring step further configures the policy decision stash such that the predictive policy decisions stored in the policy decision stash for the plurality of managed objects are further capable of being incrementally updated and accessed in the policy decision stash by a unique object identifier.

13. The method of claim 10, further comprising the step of configuring the policy decision stash such that the predictive policy decisions stored therein for the plurality of managed objects are further capable of being incrementally updated and accessed in the policy decision stash by a unique object identifier.

14. The method of claim 10, further comprising the step of configuring the policy decision stash to provide file storage data lifecycle management by fetching the policy decision records for the policy identifiers whose effective timestamps are current or in the past, and implementing actions associated with the policy identifiers of the fetched policy decision records.

15. The method of claim 10, further comprising the steps of:
  storing, in corresponding policy decision records in the policy decision stash, metrics for the plurality of managed objects; and
  configuring the policy decision stash to provide object storage data forecasting and planning by fetching the policy decision records for the policy identifiers whose effective timestamps are within a specified future date and time range, and collecting and analyzing the metrics for the fetched policy decision records and any of the plurality of managed objects corresponding thereto.

16. The method of claim 10, further comprising the step of configuring the policy decision stash to facilitate the enforcement of the predictive policy decisions by fetching the policy decision records stored in the policy decision stash for the policy identifiers whose effective timestamps are current or in the past, and implementing actions associated with the policy identifiers of the fetched policy decision records.

17. The method of claim 10, further comprising the configuring the policy decision stash to facilitate the selection of one or more of the policy decision records in the policy decision stash to satisfy a specified management goal based on both the policy identifiers and object metrics corresponding to the plurality of managed objects.

18. A computer program product comprising a computer storage medium including computer usable program code executed by a processor for storage lifecycle management of a plurality of managed objects, said computer program product including:
  computer usable program code for storing, in a policy decision stash, predictive policy decisions for the plurality of managed objects;
  computer usable program code for configuring the policy decision stash such that the predictive policy decisions for the plurality of managed objects are capable of both being incrementally updated and accessed in the policy decision stash by a policy identifier and an effective timestamp for the policy identifier;

computer usable program code for configuring the policy decision stash to store a set of policy decision records, wherein each of the policy decision records in the set are stored so as to be respectively associated with the policy identifier, the effective timestamp, and a unique object identifier corresponding thereto; and wherein each of the decision records stored in the policy decision stash is further associated with a decision priority metric and a file weighting metric.

19. The computer program product of claim 18, wherein the effective timestamp corresponds to an earliest date and an earliest time at which a given one of the predictive policy decisions dictates a management action is to be initiated against a corresponding one or more of the plurality of managed objects.

20. The computer program product of claim 18, wherein said computer usable program code for configuring further configures the policy decision stash such that the predictive policy decisions stored in the policy decision stash for the plurality of managed objects are further capable of being incrementally updated and accessed in the policy decision stash by a unique object identifier.

21. The computer program product of claim 18, further comprising computer usable program code for configuring the policy decision stash such that the predictive policy decisions stored therein for the plurality of managed objects are further capable of being incrementally updated and accessed in the policy decision stash by a unique object identifier.

22. The computer program product of claim 18, further comprising computer usable program code for configuring the policy decision stash to provide file storage data lifecycle management by fetching the policy decision records for the policy identifiers whose effective timestamps are current or in the past, and implementing actions associated with the policy identifiers of the fetched policy decision records.

23. The computer program product of claim 18, further comprising:

computer usable program code for storing, in corresponding policy decision records in the policy decision stash, metrics for the plurality of managed objects; and computer usable program code for configuring the policy decision stash to provide object storage data forecasting and planning by fetching the policy decision records for the policy identifiers whose effective timestamps are within a specified future date and time range, and collecting and analyzing the metrics for the fetched policy decision records and any of the plurality of managed objects corresponding thereto.

24. The computer program product of claim 18, further comprising computer usable program code for configuring the policy decision stash to facilitate the enforcement of the predictive policy decisions by fetching the policy decision records stored in the policy decision stash for the policy identifiers whose effective timestamps are current or in the past, and implementing actions associated with the policy identifiers of the fetched policy decision records.

25. The computer program product of claim 18, further comprising computer usable program code for configuring the policy decision stash to facilitate the selection of one or more of the policy decision records in the policy decision stash to satisfy a specified management goal based on both the policy identifiers and object metrics corresponding to the plurality of managed objects.

* * * * *